(12) United States Patent
Low et al.

(10) Patent No.: US 8,952,958 B1
(45) Date of Patent: Feb. 10, 2015

(54) STEREOSCOPIC COMPUTER-ANIMATION TECHNIQUES BASED ON PERCEPTUAL CONSTRAINTS

(71) Applicant: DreamWorks Animation LLC, Glendale, CA (US)

(72) Inventors: Matthew Low, Santa Monica, CA (US); Donald Greenberg, Ithaca, NY (US); Philip Mcnally, Eagle Rock, CA (US)

(73) Assignee: DreamWorks Animation LLC, Glendale, CA (US)

( * ) Notice: Subject to any disclaimer, the term of this patent is extended or adjusted under 35 U.S.C. 154(b) by 142 days.

(21) Appl. No.: 13/845,701

(22) Filed: Mar. 18, 2013

Related U.S. Application Data

(63) Continuation of application No. 13/563,662, filed on Jul. 31, 2012, now abandoned.

(51) Int. Cl.
*G06T 15/00* (2011.01)
*G06T 13/00* (2011.01)
*G06T 13/20* (2011.01)

(52) U.S. Cl.
CPC ................................. *G06T 13/20* (2013.01)
USPC .......................................... 345/419; 345/474

(58) Field of Classification Search
CPC ......... G06T 11/00; G06T 11/60; G06T 13/00; G06T 13/20; G06T 13/40; G06T 13/80; G06T 15/00; G06T 15/06; G06T 15/08; G06T 15/10; G06T 15/20; G06T 15/50; G06T 15/506; G06T 15/60; G06T 15/80; G06T 17/00; G06T 19/00
USPC ......... 345/418, 419, 420, 426, 427, 473, 474, 345/475, 581, 619
See application file for complete search history.

(56) References Cited

U.S. PATENT DOCUMENTS

| | | | |
|---|---|---|---|
| 2007/0192722 A1* | 8/2007 | Kokubo | 715/771 |
| 2010/0039502 A1* | 2/2010 | Robinson | 348/47 |
| 2012/0250152 A1* | 10/2012 | Larson et al. | 359/464 |
| 2012/0320048 A1* | 12/2012 | Yamashita et al. | 345/419 |
| 2013/0002666 A1* | 1/2013 | Mihara et al. | 345/419 |

* cited by examiner

*Primary Examiner* — James A Thompson
(74) *Attorney, Agent, or Firm* — Morrison & Foerster LLP

(57) ABSTRACT

A computer-implemented method for defining a range of bounding parameter values that satisfy perceptual constraints for a stereoscopically filmed computer-generated scene. A user selection of a bounding parameter from a set of scene parameters is selected. Values for scene parameters of the set of scene parameters that were not selected as the bounding parameter are obtained. A first bounding value for the bounding parameter is calculated based on a first perceptual constraint and based on the values of the scene parameters of the set of scene parameters that were not selected. A second bounding value for the bounding parameter is also calculated based on a second perceptual constraint and based on the values of the scene parameter of the set of scene parameters that were not selected. The first and second bounding values define a minimum and a maximum value of a range of values and are stored.

29 Claims, 7 Drawing Sheets

STEREOSCOPIC COMPUTER-ANIMATION TECHNIQUES BASED ON PERCEPTUAL CONSTRAINTS

BACKGROUND

1. Field

The present disclosure relates generally to composing a computer-generated scene based on perceptual constrains, and more specifically to determining a minimum and maximum value for a bounding parameter based on ocular divergence and convergence constraints.

2. Related Art

Cinematographic-quality computer animation has evolved to produce increasingly realistic and engaging visual effects. One way that this is accomplished is through the use of stereoscopic filming techniques that simulate human binocular vision by presenting slightly different viewpoints of a scene to a viewer's left and right eye. This technique, also known colloquially as "3D," can be used to enhance the illusion of depth perception and make objects in a computer-generated scene appear to extend outward from a two-dimensional screen.

In normal human binocular vision, each eye views the world from a slightly different perspective. The difference in the view from each eye, also called parallax, is caused, in part, by the spatial separation between the eyes. The brain is able to combine the different views from each eye and use the parallax between views to perceive the relative depth of real-world objects.

Computer animation stereoscopic filming techniques take advantage of the brain's ability to judge depth through parallax by presenting separate images to each eye. Each image depicts a computer-generated object from a slightly different viewpoint. The distance between the left and right images displayed on a screen (parallax) indicates the relative depth of the displayed computer-generated object. Parallax can be positive or negative depending on whether the computer-generated object appears to be behind the screen (positive parallax) or if it appears to be in front of the screen (negative parallax).

In the real world, a viewer's eyes typically focus on a point on an object at a distance from the viewer. The distance from the viewer to the point of focus is also called the focal length. The viewer's eyes may also rotate inward to converge on the same point. The distance from the viewer to the intersection of the optical path of the left and right eye (convergence point) is also called the convergence distance. In normal human binocular vision, the focal distance and the convergence distance are approximately the same. However, displaying a stereoscopic image of an object with left and right viewpoints (separated by a parallax distance), creates a disparity between the focal distance and the convergence distance. The focal distance is essentially fixed as the distance to the screen, while the convergence distance is either in front of or behind the screen, depending on the amount of parallax for an object in the stereoscopic image.

This disparity between focal length and convergence distance may cause problems if the disparity is too large. With respect to stereoscopically filmed images, there are perceptual constraints on the amount of convergence or divergence of the viewer's eyes given the fixed focal length to the display screen. Exceeding these perceptual constraints may cause discomfort for the viewer or result in a pair of images that cannot be resolved to produce a satisfactory three-dimensional effect.

In computer animation, the expected amount of convergence/divergence is determined by a number of interrelated stereoscopic parameters (scene parameters), as discussed in more detail below. Traditionally, the values of many of the scene parameters are fixed or only allowed to vary within a range of hard limits. The fixed values or hard limits serve as a rule-of-thumb for editors and directors, but do not guarantee that the perceptual constraints will be satisfied. Additionally, limiting the scene parameters to a fixed value or fixed range of values may under-utilize the design space when composing a computer-generated scene. That is, fixed ranges limit the ability to make trade-offs between the interrelated scene parameter, which may limit the ability to produce dynamic three-dimensional effects.

The systems and methods described herein provide techniques for computing a range of values for a selected scene parameter that satisfy perceptual constraints.

BRIEF SUMMARY

One exemplary embodiment is directed to a computer-implemented method for defining a range of bounding parameter values that satisfy perceptual constraints for a computer-generated scene having a computer-generated object in view of at least one camera of a pair of cameras. A user selection of a bounding parameter from a set of scene parameters is selected. The scene parameters comprise: a working distance (d) of the computer-generated scene, wherein the working distance (d) is measured from the pair of cameras to a point in the computer-generated scene, a focal distance (f) for the pair of cameras, a sensor width ($W_c$) for the pair of cameras, a separation distance (t) between the pair of cameras, an inter-ocular distance (e) between a left perspective position and a right perspective position of the modeled viewer, and a screen width ($W_s$) for a modeled screen. Values for scene parameters of the set of scene parameters that were not selected as the bounding parameter are obtained. A first bounding value for the bounding parameter is calculated based on a first perceptual constraint and based on the values of the scene parameters of the set of scene parameters that were not selected as the bounding parameter. A second bounding value for the bounding parameter is also calculated based on a second perceptual constraint and based on the values of the scene parameter of the set of scene parameters that were not selected as the bounding parameter. The first and second bounding values define a minimum and a maximum value of a range of values for the bounding parameter that satisfy the first and second perceptual constraints. The first and second bounding values for the bounding parameter are stored.

In some embodiments, an indicia of one of the minimum and the maximum value of the bounding parameter are presented to the user. Presenting the indicia of one of the first and second bounding values to the user may include presenting a warning that one of the minimum and maximum values for the bounding parameter has been exceeded.

In some embodiments, the first perceptual constraint represents a maximum positive-parallax condition, wherein a maximum parallax distance between a left and right displayed images of the computer-generated object is less than or equal to the inter-ocular distance (e) between a left perspective position and a right perspective position of the modeled viewer.

In some embodiments, a sensor offset parameter (h) is defined for the pair of cameras as the distance between a center of a sensor for the at least one camera of the pair of cameras and an optical center of the at least camera of the pair of cameras. A maximum working distance ($d_{max}$) is defined as the distance from the pair of cameras to the point on the computer-generated object farthest from the pair of cameras. In this particular embodiment, the first perceptual constraint requires that f times t divided by $d_{max}$ plus e times $W_c$ divided by $W_s$ minus h is greater than zero.

In some embodiments, the second perceptual constraint represents a maximum negative-parallax condition, wherein a difference between a convergence distance for modeled viewer and a viewing distance ($V_z$) from the modeled viewer to the modeled viewing screen is less than ⅓ diopters.

In some embodiments, a sensor offset parameter (h) is defined for the pair of cameras as the distance between a center of a sensor for the at least one camera of the pair of cameras and an optical center of the at least camera of the pair of cameras, a viewing distance ($V_z$) is defined as the distance from the modeled viewer to the modeled viewing screen, and a minimum working distance ($d_{min}$) is defined as the distance from the pair of cameras to the point on the computer-generated object closest to the pair of cameras. In this embodiment, the second perceptual constraint requires that f times t divided by $d_{min}$ plus e times $V_z$ times ⅓ $W_c$ divided by $W_s$ minus h is less than zero.

In some embodiments, the computer-generated object is positioned in the computer-generated scene based on one of the minimum and maximum values for the bounding parameter. The pair of cameras may also be positioned in the computer-generated scene based on one of the minimum and maximum values for the bounding parameter. A pair of sensors may also be positioned with respect to a pair of camera lenses for the pair of cameras based on one of the minimum and maximum values for the bounding parameter.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Figure 1:
FIG. 1 depicts a stereoscopically filmed, computer-generated scene.

FIG. 1 depicts a stereoscopically filmed, computer-generated scene. The scene depicts two animated characters viewed in profile from the side. For purposes of this discussion, each animated character is treated as a single computer-generated object. The image depicted in FIG. 1 is a composite of two views of the computer-generated scene: one view from a left camera and one view from a right camera. The left and right camera views can be used to produce a stereoscopic image of the computer-generated scene. Typically, the cameras used to produce the left and right views are offset a distance that corresponds to an estimated distance between the viewer's eyes (approximately 65 mm).

The image in FIG. 1 appears slightly blurred because the animated characters (exemplary computer-generated objects) are viewed from the slightly different positions of the left and right camera. However, when the image is viewed with appropriate stereoscopic equipment, the left-camera view is presented to the viewer's left eye in isolation and the right-camera view is presented to the viewer's right eye in isolation. This can be achieved using a number of techniques that are known in the art, including, for example, use of stereoscopic glasses. Using these known techniques, the left-camera view is separately presented to the left eye using polarized or color-coded light that corresponds to a polarized or color-coded left lens of the stereoscopic glasses. Similarly, the right-camera view is separately presented to the right eye using polarized or color-coded light that is distinguishable from the left-camera view.

The viewer is able to mentally and visually combine the left-camera and right-camera view into a composite image that includes a certain degree of parallax for one or more computer-generated objects. The greater the parallax, the closer/farther the computer-generated object appears to the viewer (with respect to the display screen). As discussed above, a filmmaker can use this stereoscopic effect to make computer-generated objects appear to have depth even though they are displayed on what is essentially a two-dimensional display screen.

1. Filming and Viewing a Stereoscopic Computer-Generated Scene

Figure 2A:
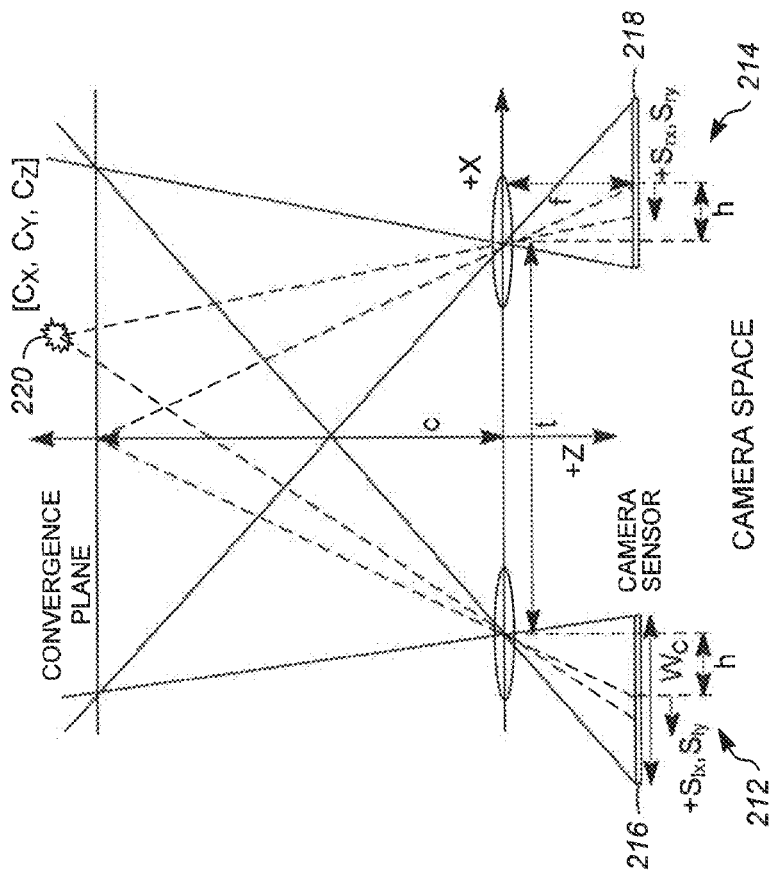
FIGS. 2A and 2B depict exemplary configurations for stereoscopically filming a computer-generated scene.
Figure 2B:
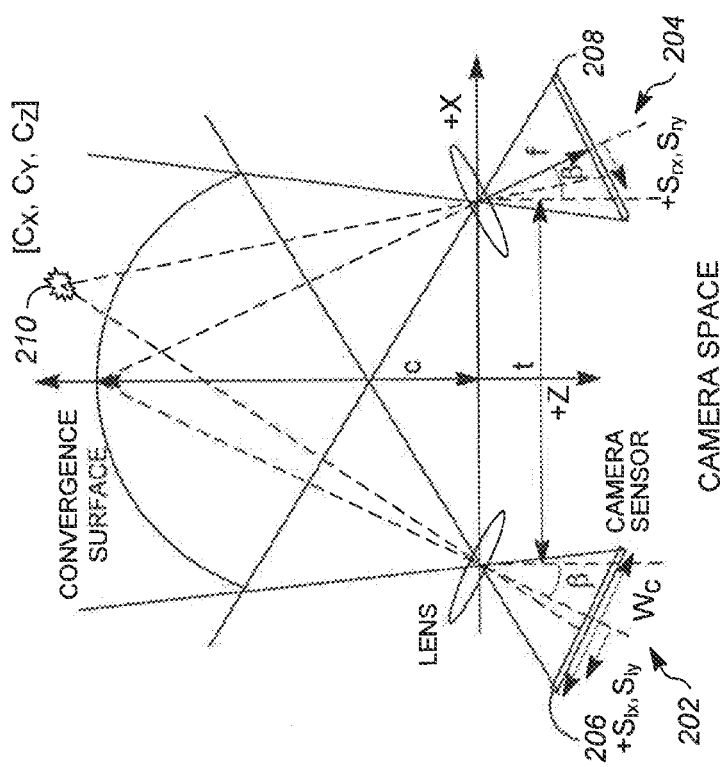

FIGS. 2A and 2B depict exemplary optical configurations of a stereoscopically filmed computer-generated scene in camera space. The configurations include a left camera (202, 212) and a right camera (204, 214) that are capable of viewing a point (210, 220) on an object in a computer-generated scene. FIGS. 2A and 2B depict alternative configurations for positioning the cameras when filming the computer-generated scene. FIG. 2A depicts a converged camera configuration with the cameras 202 and 204 pointed inward at an angle β and converging along a curved convergence surface. FIG. 2B depicts an alternative configuration with cameras 212 and 214 pointed in a parallel direction and having sensors (216, 218) offset from the center of their respective lens at a distance h. In FIG. 2B, the parallel cameras 212 and 214 converge along a convergence plane. Either of the camera configurations shown in FIG. 2A or 2B can be used to stereoscopically film a computer-generated scene.

With reference to FIG. 2A, the left and right cameras (202, 204) each record a different image of the computer generated scene, which includes point 210. The left camera 202 records an image of the point 210 at left-image location ($S_{lx}$, $S_{ly}$) using the left camera sensor 206. Similarly, the right camera 202 records an image of the point 210 at right-image location ($S_{rx}$, $S_{ry}$) using the right camera sensor 208. The difference between the left-image location ($S_{lx}$, $S_{ly}$) and the right-image location ($S_{rx}$, $S_{ry}$) indicates the amount of parallax for point 210. Similarly, with reference to FIG. 2B, the left and right cameras (212, 214) each record a different image of the point 220 at left-image location ($S_{lx}$, $S_{ly}$) for left sensor 216 and the right-image location ($S_{rx}$, $S_{ry}$) for right sensor 218.

FIGS. 2A and 2B also depict several scene parameters that have an impact on how computer-generated objects or points in the computer-generated scene will be perceived by the viewer. The three-dimensional scene coordinate ($C_x$, $C_y$, $C_z$) describes the location of the point 210 within the computer-generated scene. Convergence distance c is the distance from the lenses and the convergence surface or convergence plane. The convergence surface/plane corresponds to the location of points that will have zero parallax between the left and right images. Also, points located further away from the convergence surface/plane will have greater parallax than those points that are closer to the convergence surface/plane. The camera separation t represents the distance between optical nodes of the left and right cameras, and may also have an impact on the amount of parallax. The left and right cameras also have sensor width $W_c$ and a focal length f from the sensor to the lens.

Figure 2C:
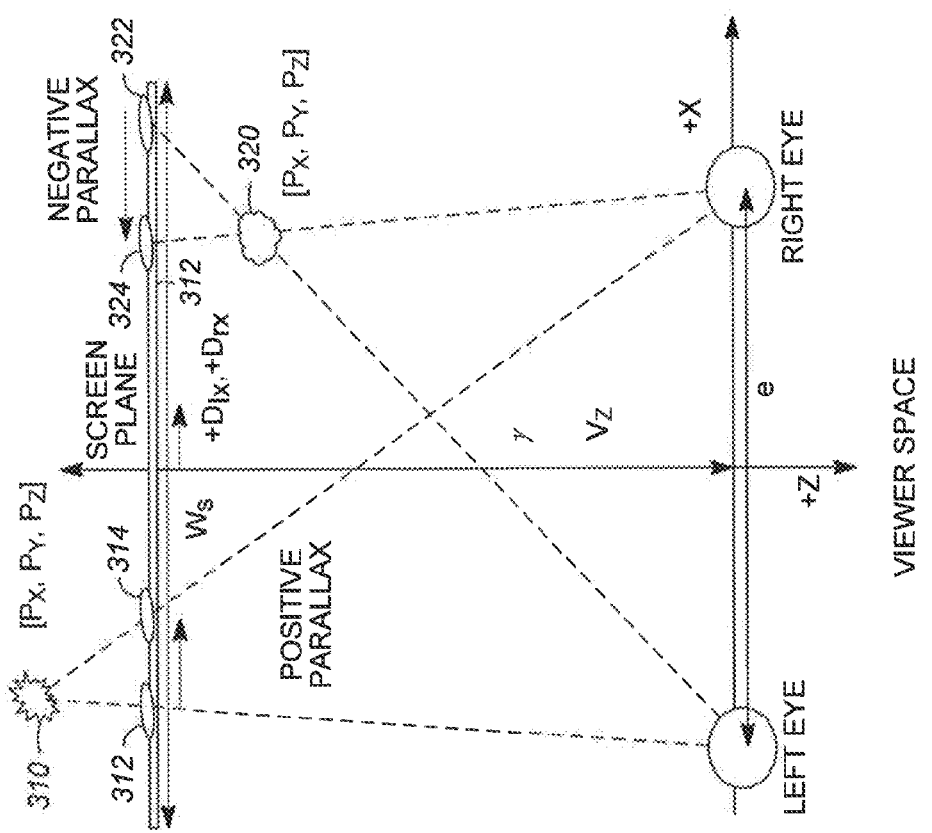
FIG. 2C depicts an exemplary configuration for displaying a stereoscopically filmed scene.

FIG. 2C depicts an exemplary configuration of a stereoscopically filmed computer-generated scene in viewer space. In general, viewer space represents how a stereoscopically filmed, computer-generated scene may be perceived by a modeled viewer located a specified distance from a modeled screen. As shown in FIG. 2C, the modeled viewer has an inter-ocular distance e and is positioned a distance $V_z$ from the modeled screen having a screen width $W_s$. FIG. 2C depicts how left and right views, each presented to the modeled viewer's left and right eye respectively, result in eye convergence that simulate the points as being out of plane from the screen. Specifically, FIG. 2C depicts perceived point 310 that appears to be behind the screen plane, and perceived point 320 that appears to be in front of the screen plane.

Perceived point 310 is represented by left-camera image 312 and right-camera image 314. Because the left-camera image 312 is to the left of right-camera image 314, the perceived point 310 is said to have positive parallax and will appear to the viewer to have a depth that is greater than the distance from the viewer to the screen $V_z$. In other words, to the viewer, the perceived point 310 will appear to exist behind the screen plane.

Similarly, perceived point 320 is represented by left-camera image 322 and right-camera image 324. Because the left-camera image 322 is to the right of right-camera image 324, the perceived point 320 is said to have negative parallax and will appear to the viewer to have a depth that is less than the distance from the viewer to the screen $V_z$. In other words, to the viewer, the perceived point 320 will appear to exist in front of the screen plane.

A stereoscopically filmed scene with parallax as depicted in FIG. 2C creates a disparity between the convergence distance to the perceived points (310, 320) and focal length (distance from the modeled viewer to the screen $V_z$). As discussed above, too much parallax may create too large of a disparity and violate one or more perceptual constraints. This may cause discomfort for the viewer or result in a pair of images that cannot be resolved to produce a satisfactory three-dimensional effect. Traditionally, the amount of parallax was controlled by limiting certain scene parameters to a fixed value or range of values. However, this traditional technique may limit the ability of the film creator to take full advantage of the stereoscopic film space to emphasize three-dimensional effects in the computer-generated scene.

Therefore, it is generally desirable to determine a range of values for various scene parameters that result in a parallax condition that satisfies perceptual constraints for a typical viewer. The system and techniques discussed below can be used to calculate a maximum and minimum value for a selected scene parameter based on perceptual constraints.

2. Calculating Scene Parameters Based on Perceptual Constraints

Figure 3A:
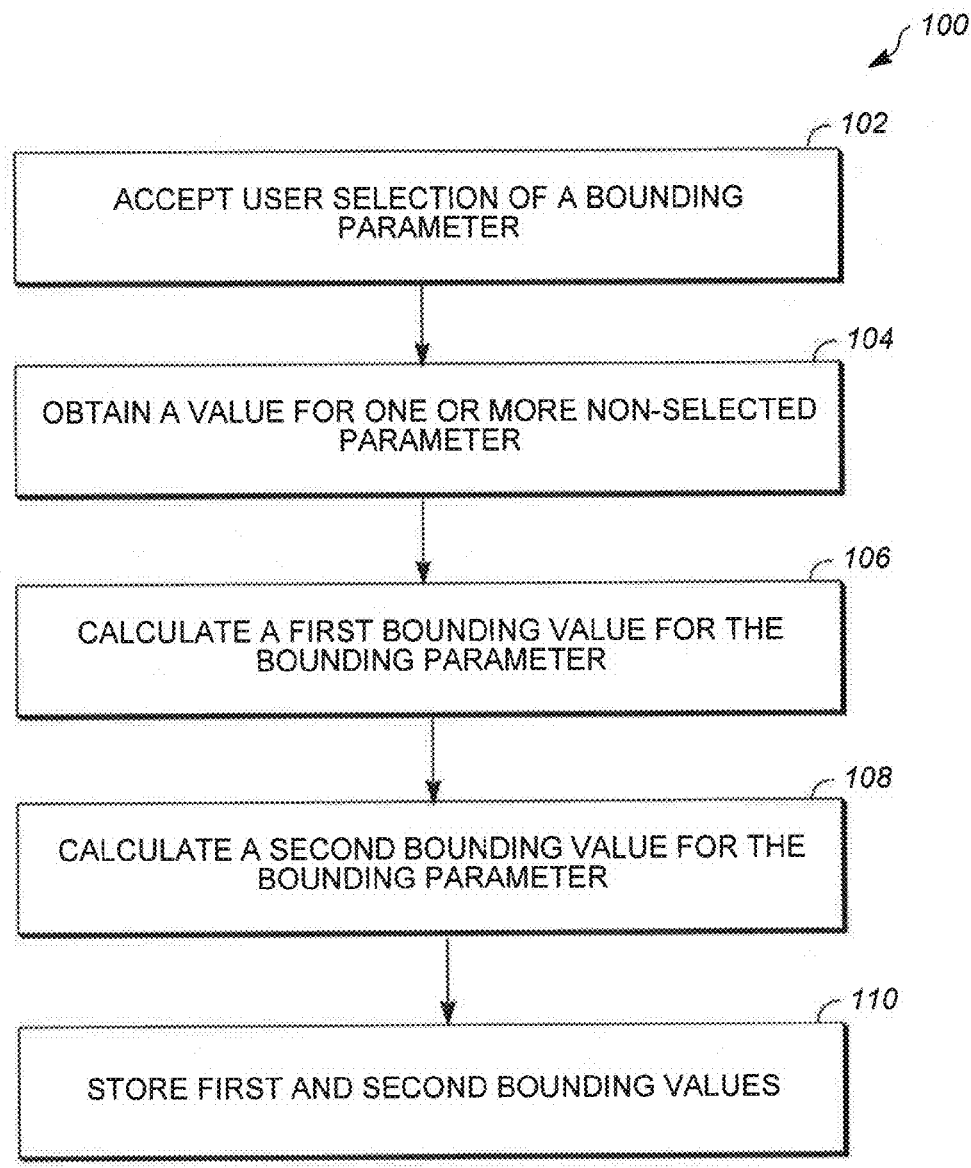
FIG. 3A depicts an exemplary process for computing a range of scene parameter values that satisfy perceptual constraints.

FIG. 3A depicts a flow chart of an exemplary process 100 for calculating a range of values for scene parameter with respect to perceptual constraints for a (hypothetical) modeled viewer. Using process 100, a user can select a scene parameter of interest, and calculate a minimum and maximum value for the selected scene parameter that satisfies the perceptual constraints.

With respect to process 100, the perceptual constraints are defined with respect to the maximum convergence and maximum divergence for the modeled viewer. With respect to a typical stereoscopically filmed image, a first perceptual constraint may be defined with respect to the maximum amount of convergence of a modeled viewer's eyes and correspond to a maximum amount of negative parallax. A second perceptual constraint may be defined with respect to a maximum amount divergence and correspond to a maximum amount of negative parallax.

In operation 102, a user selection of a bounding parameter from a set of scene parameters to be constrained by the two perceptual constraints is accepted. In general, the set of scene parameters include those parameters that affect the maximum amount of positive or negative parallax in stereoscopically filmed image that is displayed on a modeled screen. More specifically, the set of scene parameters represent the location of the pair of cameras used to film the scene, the working distance (or depth) of the scene, and the position of a modeled viewer with respect to the modeled screen.

The set of scene parameters may include a working distance d of the computer-generated scene. The working distance d is measured from the pair of cameras to a point in the computer-generated scene and can be used to represent the preferred location of a computer-generated object with respect to the pair of cameras. The set of scene parameters may also include a sensor offset parameter h for the pair of cameras, a focal length f of the pair of cameras, a sensor width $W_c$ for the pair of cameras, and a separation distance t between the pair of cameras. For a converging pair of cameras, the set of scene parameters may also include a convergence angle β. With respect to the modeled viewer, the set of scene parameters may also include an inter-ocular distance e between a left perspective position and a right perspective position of the modeled viewer, a screen width $W_s$ for a modeled screen, and a viewing distance $V_z$ from the modeled viewer to the modeled viewing screen.

If the user selects the working distance d as the bounding parameter, process 100 can be used to calculate the range of distances between a modeled viewer and a modeled screen that will not exceed the perceptual constraints. However, because the user can select any of the scene parameters as a bounding parameter, the process 100 can also be used to calculate a range of camera separation distances t, a range of sensor offsets h, or a range of any other parameter of the set of scene parameters.

In operation 104, a value for one or more scene parameters that were not selected as a bounding parameter is obtained. The value of the remaining scene parameters may be determined, for example, based on the placement of the pair of cameras in the computer-generated scene, the placement of computer-generated objects within the computer-generated scene, and/or the placement of the modeled viewer with respect to the modeled screen. The value of the remaining scene parameters may also be obtained from a user-specified input.

In operation 106, a first bounding value for the bounding parameter is calculated based on a first perceptual constraint and the values of the scene parameters obtained on operation 104. The first bounding value can represent either a maximum or minimum value for the bounding parameter, depending on which scene parameter is selected in operation 102.

In this example, the first perceptual constraint represents a maximum divergence condition for a modeled viewer's eyes. Equation 1, below, depicts an equation that can be used to express the first perceptual constraint and represents a condition in which the modeled viewer's eyes cannot diverge outward and are limited by parallel vision. That is, the amount of positive parallax between left and right displayed images cannot exceed the distance between a modeled viewer's eyes. Based on this assumption, the first perceptual constraint can be expressed as:

$$\frac{f*t}{d_{max}} + \frac{e*W_c}{W_s} - h > 0, \qquad [1]$$

where f is the focal length of the pair of cameras, t is the distance between the cameras, $d_{max}$ is the distance to the furthest point on an object from the cameras (maximum working distance), e is the distance between left and right perspectives of a modeled viewer (distance between a modeled viewer's eyes), $W_c$ is the width of the camera sensor, $W_s$ is the width of the modeled screen, and h is the sensor offset.

In one example of operation 106, the obtained values of the scene parameters (not selected as the bounding parameter) may be used with Equation 1 to calculate a maximum value of the bounding parameter. In one specific example, the working distance d may be selected as the bounding parameter. Equation 1 can be algebraically solved for the maximum working distance $d_{max}$, and expressed as:

$$d_{max} < \frac{f*t}{h - e(W_c/W_s)}. \qquad [2]$$

By plugging in obtained values for scene parameters f, t, h, e, $W_c$ and $W_s$, equation 2 can be used to calculate a maximum value of the maximum working distance $d_{max}$. While Equation 2 illustrates one example calculation for the maximum working distance $d_{max}$, it is not necessary to algebraically solve equation 1 to calculate bounding parameter and Equation 1 can be used to calculate any one of the set of scene parameters selected as the bounding parameter.

In operation 108, a second bounding value for the bounding parameter is calculated using a second perceptual constraint and the values of the scene parameters obtained on operation 104. The second bounding value can represent either a maximum or minimum value for the bounding parameter, depending on which scene parameter is selected in operation 102.

In this example, the second perceptual constraint represents a maximum convergence condition for a modeled viewer's eyes. Equation 3, below, depicts an equation that can be used to express the second perceptual constraint and represents a condition in which the modeled viewer's eyes cannot converge on a point that is closer than a specified number of diopters D from the modeled screen. That is, the amount of negative parallax between left and right displayed images cannot exceed a theoretical limit. Based on this assumption, the second perceptual constraint can be expressed as:

$$\frac{f*t}{d_{min}} + \frac{-e*V_z*D*W_c}{W_s} - h < 0, \qquad [3]$$

where $d_{min}$ is distance from the camera to the nearest point on a computer-generated object from the cameras (minimum working distance) and D is the number of diopters the from the modeled screen the modeled viewer's eyes can converge. Typically, the number of diopters D expressed as the inverse of the modeled viewer's focal length. A typical value for the number of diopters D is about ⅓, which corresponds the maximum difference between focal length and convergence distance that can be resolved by a typical (actual) viewer.

In one example of operation 108, the obtained values of the scene parameters (not selected as the bounding parameter) may be used with Equation 3 to calculate a minimum value of the bounding parameter. In one example, the working distance d may be selected as the bounding parameter. Equation 3 can be algebraically solved for the minimum working distance $d_{min}$, and expressed as:

$$d_{min} > \frac{f*t}{e*V_z*D*(W_c/W_s) + h}. \qquad [4]$$

By plugging in obtained values for scene parameters f, t, h, e, $V_z$, D, $W_c$, and $W_s$, equation 4 can be used to calculate a minimum value for the minimum working distance $d_{min}$. As previously mentioned with respect to operation 106, it is not necessary to algebraically solve equation 1 to calculate bounding parameter and Equation 1 can be used to calculate any one of the set of scene parameters selected as the bounding parameter.

In operation 110, the first and second bounding values (minimum and maximum values) are stored. The values may be stored, for example, on a non-transitory computer-readable storage medium, such as computer disk storage. Other computer storage examples are provided below and discussed with respect to FIG. 5

In some embodiments, an indicia of the minimum and maximum values for the bounding parameter are presented to the user. For example, numerical values of the minimum and maximum of the bounding parameter may be presented to the user on a computer display monitor on a computer system as described in Section 3, below. In another example, a warning message is presented to the user indicating that the minimum and maximum values for the bounding parameter have been exceeded.

The minimum and maximum values for the bounding parameter may be used to adjust a corresponding element in scene space (FIGS. 2A-B) or viewer space (FIG. 2C). For example, the user may adjust a value of the bounding parameter either directly through input of a numerical value or indirectly by adjusting the position of a camera or computer-generated object in the scene. The user may then be presented with a warning message indicating that either the maximum or minimum value of the boundary parameter has been exceeded by the user's adjustment.

Figure 3B:
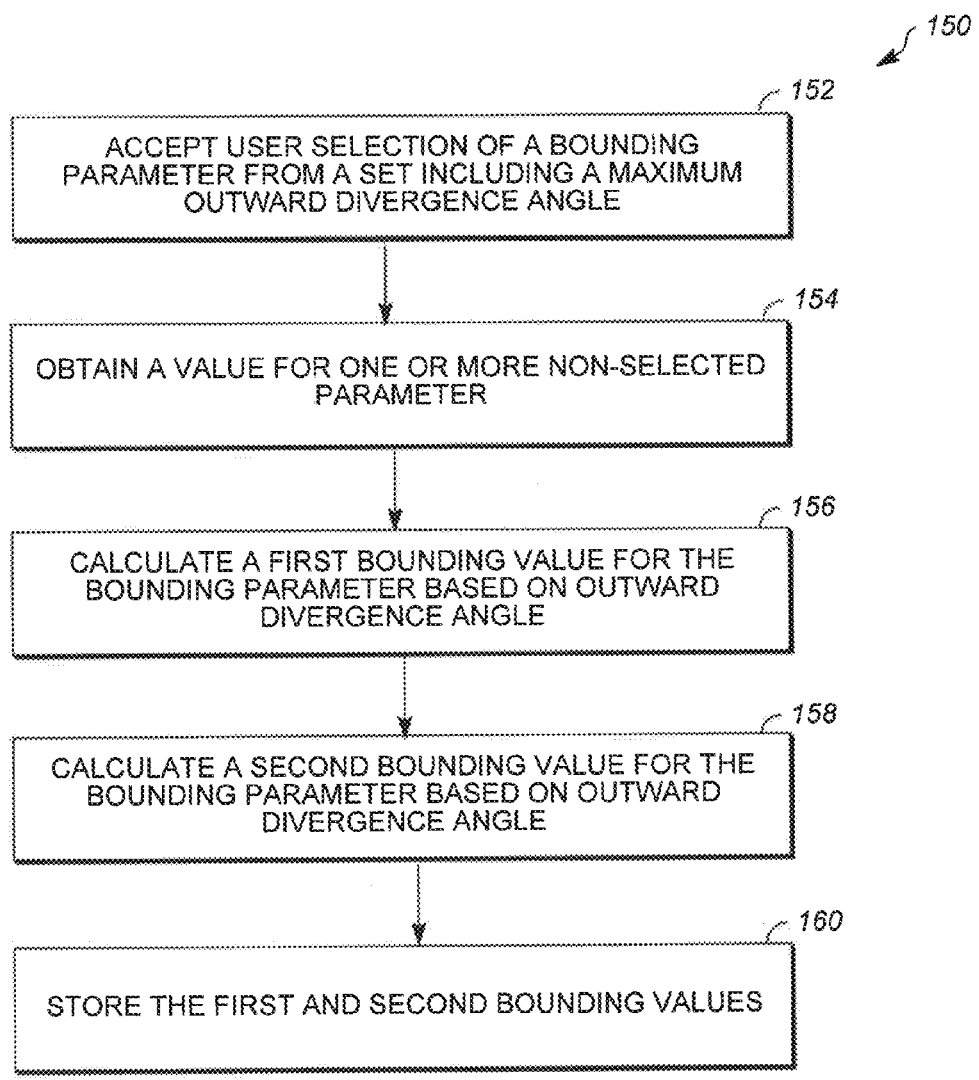
FIG. 3B depicts another exemplary process for computing a range of scene parameter values that satisfy perceptual constraints.

FIG. 3B depicts another exemplary process 150 for calculating a range of values for scene parameter with respect to two perceptual constraints for a modeled viewer. Exemplary process 150 is similar to exemplary process 100, except that a maximum ocular divergence angle for the modeled viewer can also be expressly specified. This allows for a greater range of positive parallax because the distance between the left and right displayed viewpoints can exceed the distance between the modeled viewer's eyes.

Figure 4:
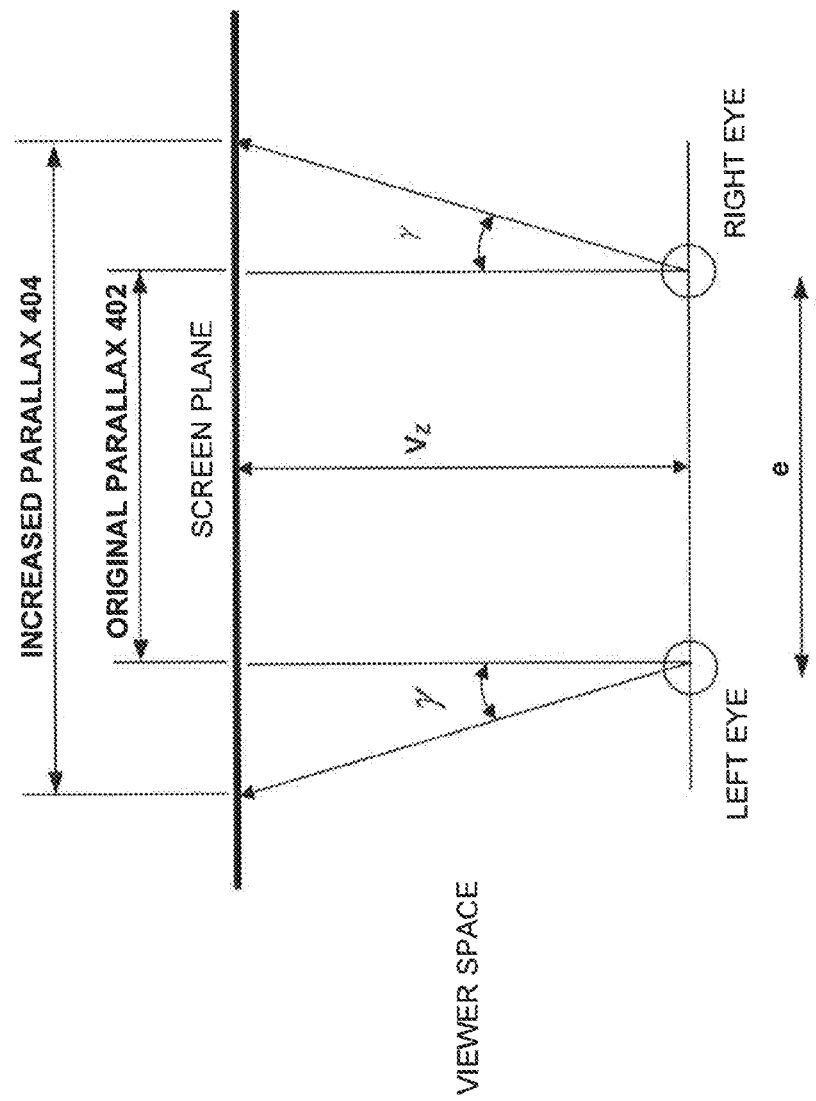
FIG. 4 depicts an exemplary configuration with a modeled viewer having a maximum ocular divergence angle.

FIG. 4 depicts an exemplary configuration with a modeled viewer having a maximum ocular divergence angle γ. The original parallax 402 represents the maximum amount of positive parallax if the viewer's eyes cannot be diverged outward. The increased parallax 404 represents the increase in the amount of positive parallax that can used for a viewer having a maximum outward divergence angle γ. In some cases, the maximum ocular divergence angle γ is determined by the amount of comfortable outward divergence that can be tolerated by a typical actual viewer without causing discomfort. The maximum ocular divergence angle γ may be less than 0.25° for each left and right perspective of the modeled viewer.

With reference again to FIG. 3B, in operation 152, a user selection of a bounding parameter from a set of scene parameters to be constrained by the two perceptual constraints is accepted. The set of scene parameters includes those scene parameters described above with respect to operation 102. In addition, the set of scene parameter also includes a maximum ocular divergence angle γ.

In operation 154, a value for each of the remaining scene parameters that were not selected as a bounding parameter is obtained. Similar to operation 104, the value for each of the remaining scene parameters may be determined, for example, based on the placement of the pair of cameras in the computer-generated scene, the placement of computer-generated objects within the computer-generated scene, and/or the placement of the modeled viewer with respect to the modeled screen.

In operation 156, a first bounding value for the bounding parameter is calculated based on a first perceptual constraint and the values of the scene parameters obtained on operation 154, including the maximum ocular divergence angle γ. As in previous examples, the first bounding value can represent either a maximum or minimum value for the bounding parameter, depending on which scene parameter is selected in operation 152.

Similar to operation 106, the first perceptual constraint represents a maximum divergence condition for a modeled viewer's eyes. Equation 5, below, depicts an equation that can be used to express the first perceptual constraint and represents a condition in which the modeled viewer's eyes can diverge a maximum angle γ. As a result, the amount of positive parallax between left and right displayed images can exceed the distance between a modeled viewer's eyes. Based on this assumption, the first perceptual constraint can be expressed as:

$$\frac{f*t}{d_{max}} + \frac{(e + 2V_z \tan(\gamma))*W_c}{W_s} - h > 0, \qquad [5]$$

where the expression $e+2V_z \tan(\gamma)$ can also be referred to as an effective inter-ocular distance e'. To perform operation 106, the obtained values of the scene parameters (not selected as the bounding parameter) may be used with Equation 5 to calculate a either minimum or maximum value of the bounding parameter.

In operation 158, a second bounding value for the bounding parameter is calculated using a second perceptual constraint and the values of the scene parameters obtained on operation 154, including the maximum ocular divergence angle γ. As in previous examples, the second bounding value can represent either a maximum or minimum value for the bounding parameter, depending on which scene parameter is selected in operation 152.

Similar to operation 108, the second perceptual constraint represents a maximum convergence condition for a modeled viewer's eyes. Equation 6, below, depicts an equation that can be used to express the second perceptual constraint and represents a condition in which the modeled viewer's eyes cannot converge on a point that is closer than a specified number of diopters D from the modeled screen. Based on this assumption, the second perceptual constraint can be expressed as:

$$\frac{f*t}{d_{min}} + \frac{-e*V_z*D*W_c}{W_s} - h < 0. \qquad [6]$$

To perform operation 158, the obtained values of the scene parameters (not selected as the bounding parameter) may be used with Equation 6 to calculate either a minimum or maximum value of the bounding parameter.

In operation 160, the first and second bounding values (minimum and maximum values) are stored. The values may be stored, for example, on a non-transitory computer-readable storage medium, such as computer disk storage. Other computer storage examples are provided below and discussed with respect to FIG. 5

In some embodiments, an indicia of the minimum and maximum values for the bounding parameter are presented to the user. Similar to operation 110, the numerical values of the minimum and maximum of the bounding parameter may be presented to the user on a computer display monitor on a computer system as described in Section 3, below. In another example, a warning message is presented to the user indicating that the minimum and maximum values for the bounding parameter have been exceeded.

Thus, exemplary processes 100 and 150 can be used to present the range of values for a selected scene parameter that will satisfy both perceptual constraints for a modeled viewer. The user or filmmaker may select a value for the bounded parameter within the range of values and compose a computer-generated scene and produce a stereoscopically filmed image or series of images based on the selected value. Composing a computer-generated scene may include, for example, positioning one or more computer-generated objects within the scene. A computer-generated scene may also be composed by position the pair of cameras within the computer-generated scene.

The stereoscopically filmed image or series of images may be used to produce a computer animation sequence or movie and displayed to a viewer on a display screen. As discussed above, the stereoscopically filmed image simulates the parallax in natural vision by presenting separate left and right viewpoints to the viewer's left and right eyes using appropriate stereoscopic equipment (e.g. 3-D glasses). Using the techniques discussed herein, a filmmaker can maximize the aspects of the scene parameter space to emphasize the three-dimensional effects of the scene without violating perceptual constraints of the viewer.

3. Implementation on a Computer Hardware Platform

Figure 5:
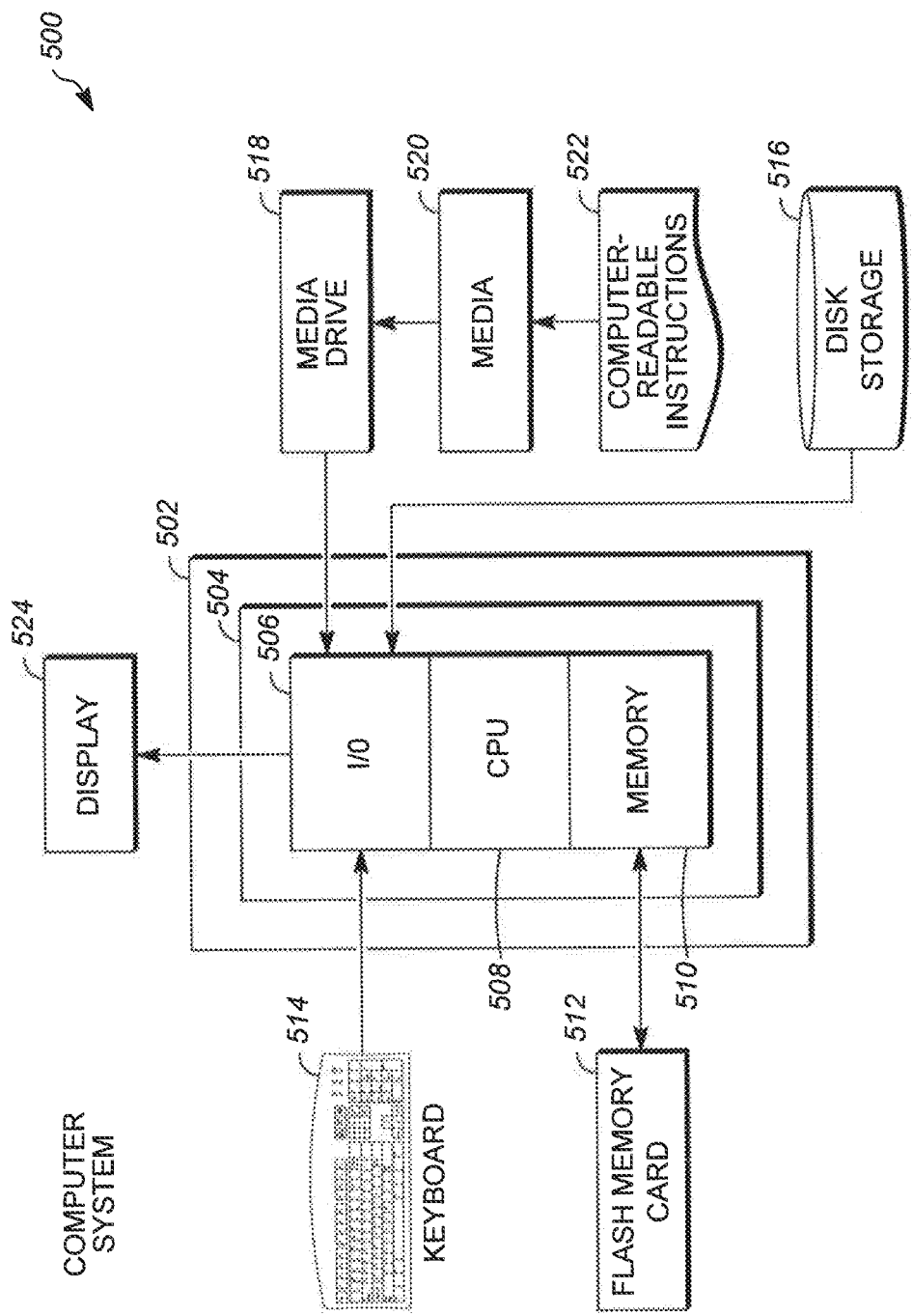
FIG. 5 depicts an exemplary computer system.

The embodiments described herein are typically implemented in the form of computer software (computer-executable instructions) executed on a computer. FIG. 5 depicts an exemplary computer system 500 configured to perform any one of the above-described processes. In this context, computer system 500 may be a general-purpose computer including, for example, a processor, memory, storage, and input/ output devices (e.g., monitor, keyboard, disk drive, Internet connection, etc.). However, computer system 500 may include circuitry or other specialized hardware for carrying out some or all aspects of the processes. In some operational settings, computer system 500 may be configured as a system that includes one or more units, each of which is configured to carry out some aspects of the processes either in software, in hardware, or in some combination thereof. For example, in some embodiments, the process for computing a minimum and maximum value for a bounding parameter, as described in FIGS. 3A and 3B, may be computed on parallel computer processors or performed on separate computer systems.

FIG. 5 depicts a computer system 500 with a number of standard components that may be used to perform the above-described processes. The main system 502 includes a motherboard 504 having an input/output ("I/O") section 506, one or more central processing units ("CPU") 508, and a memory section 510, which may have a flash memory card 512 related to it. The I/O section 506 is connected to a display 524, a keyboard 514, a disk storage unit 516, and a media drive unit 518. The media drive unit 518 can read a computer-readable medium 520, which typically contains computer-readable instructions 522 and data.

At least some values based on the results of the above-described processes can be saved for subsequent use. For example, the outputs of the system, including the maximum and minimum values for the bounding parameter, can be saved directly in memory 510 (e.g, RAM (Random Access Memory)) or another form of storage, such as disk storage 516. Additionally, values derived from the minimum and maximum bounding parameter values, such as user selection of a bounding parameter value, can also be saved directly in memory.

The above-described processes may be used to define a range of bounding parameter values that satisfy perceptual constraints for a computer-generated scene. By computing the minimum and maximum values of a bounding parameter, a user can compose and stereoscopically film a computer-generated scene to produce a stereoscopic image that does not require excessive convergence or divergence of the viewer's eyes. This stereoscopic image may be visualized as a still image or as part of a film sequence. The stereoscopic image may be stored in memory 510, disk storage 516, or viewed on a computer display 524.

Additionally, a non-transitory computer-readable medium can be used to store (e.g., tangibly embody) one or more computer programs for performing any one of the above-described processes by means of a computer. The computer program may be written, for example, in a general-purpose programming language (e.g., Pascal, C, C++) or some specialized application-specific language.

Although the invention has been described in considerable detail with reference to certain embodiments thereof, other embodiments are possible, as will be understood to those skilled in the art.

What is claimed is:

1. A computer-implemented method for defining a range of bounding parameter values that satisfy perceptual constraints for a computer-generated scene having a computer-generated object in view of at least one camera of a pair of cameras, the method comprising:

accepting a user selection of a bounding parameter from a set of scene parameters comprising:

a working distance (d) of the computer-generated scene, wherein the working distance (d) is measured from the pair of cameras to a point in the computer-generated scene, a focal distance (f) for the pair of cameras, a sensor width ($W_c$) for the pair of cameras, a separation distance (t) between the pair of cameras, an inter-ocular distance (e) between a left perspective position and a right perspective position of the modeled viewer, and a screen width ($W_s$) for a modeled screen;

obtaining values for scene parameters of the set of scene parameters that were not selected as the bounding parameter;

calculating a first bounding value for the bounding parameter based on a first perceptual constraint and based on the values of the scene parameters of the set of scene parameters that were not selected as the bounding parameter;

calculating a second bounding value for the bounding parameter based on a second perceptual constraint and based on the values of the scene parameter of the set of scene parameters that were not selected as the bounding parameter, wherein the first and second bounding values define a minimum and a maximum value of a range of values for the bounding parameter that satisfy the first and second perceptual constraints; and storing the first and second bounding values for the bounding parameter.

2. The computer-implemented method of claim 1, further comprising presenting an indicia of one of the minimum and the maximum value of the bounding parameter to the user.

3. The computer-implemented method of claim 2, wherein the presenting an indicia of one of the first and second bounding values to the user includes presenting a warning that one of the minimum and maximum values for the bounding parameter has been exceeded.

4. The computer-implemented method of claim 1, wherein the first perceptual constraint represents a maximum positive-parallax condition, wherein a maximum parallax distance between a left and right displayed images of the computer-generated object is less than or equal to the inter-ocular distance (e) between a left perspective position and a right perspective position of the modeled viewer.

5. The computer-implemented method of claim 1, wherein a sensor offset parameter (h) is defined for the pair of cameras as the distance between a center of a sensor for the at least one camera of the pair of cameras and an optical center of the at least camera of the pair of cameras, a maximum working distance ($d_{max}$) is defined as the distance from the pair of cameras to the point on the computer-generated object farthest from the pair of cameras, and the first perceptual constraint requires that f times t divided by $d_{max}$ plus e times $W_c$ divided by $W_s$ minus h is greater than zero.

6. The computer-implemented method of claim 1, wherein the second perceptual constraint represents a maximum negative-parallax condition, wherein a difference between a convergence distance for modeled viewer and a viewing distance ($V_z$) from the modeled viewer to the modeled viewing screen is less than ⅓ diopters.

7. The computer-implemented method of claim 1, wherein a sensor offset parameter (h) is defined for the pair of cameras as the distance between a center of a sensor for the at least one camera of the pair of cameras and an optical center of the at least camera of the pair of cameras, a viewing distance ($V_z$) is defined as the distance from the modeled viewer to the modeled viewing screen, a minimum working distance ($d_{min}$) is defined as the distance from the pair of cameras to the point on the computer-generated object closest to the pair of cameras, and the second perceptual constraint requires that f times t divided by $d_{min}$ plus e times $V_z$ times ⅓ $W_c$ divided by $W_s$ minus h is less than zero.

8. The computer-implemented method of claim 1, further comprising:
positioning the computer-generated object in the computer-generated scene based on one of the minimum and maximum values for the bounding parameter.

9. The computer-implemented method of claim 1, further comprising:
positioning the pair of cameras in the computer-generated scene based on one of the minimum and maximum values for the bounding parameter.

10. The computer-implemented method of claim 1, further comprising:
positioning a pair of sensors with respect to a pair of camera lenses for the pair of cameras based on one of the minimum and maximum values for the bounding parameter.

11. A computer-implemented method for composing a computer-generated scene having a computer-generated object in view of at least one camera of a pair of cameras, the method comprising:
obtaining values for a set of scene parameters comprising:
a sensor width ($W_x$) for the pair of cameras,
a separation distance (t) between the pair of cameras,
an inter-ocular distance (e) between a left perspective position and a right perspective position of a modeled viewer, and
a screen width ($W_s$) for a modeled screen;
calculating a preferred maximum scene depth ($d_{max}$) based on a first perceptual constraint and based on the obtained values of the set of scene parameters;
calculating a preferred minimum scene depth ($d_{min}$) based on a second perceptual constraint and based on the obtained values of the set of scene parameters;
composing a computer-generated scene by positioning the computer-generated object, within the computer-generated scene at a location that is greater than $d_{min}$ and less than $d_{max}$;
after composing the computer-generated scene, creating at least one stereoscopic view of the computer-generated object using the pair of cameras.

12. The computer-implemented method of claim 11, wherein the first perceptual constraint represents a maximum positive-parallax condition, wherein a maximum parallax distance between a left and right displayed images of the computer-generated object is less than or equal to the inter-ocular distance (e) between a left perspective position and a right perspective position of the modeled viewer.

13. The computer-implemented method of claim 11, wherein,
a sensor offset parameter (h) is defined for the pair of cameras as the distance between a center of a sensor for the at least one camera of the pair of cameras and an optical center of the at least camera of the pair of cameras,
the first perceptual constraint requires that f times t divided by $d_{max}$ plus e times $W_c$ divided by $W_s$ minus h is greater than zero.

14. The computer-implemented method of claim 11, wherein the second perceptual constraint represents a maximum positive-parallax condition, wherein the maximum parallax distance between a left and right image of the computer-generated object is less than or equal to the inter-ocular distance (e) between a left perspective position and a right perspective position of the modeled viewer.

15. The computer-implemented method of claim 11, wherein
a sensor offset parameter (h) is defined for the pair of cameras as the distance between a center of a sensor for the at least one camera of the pair of cameras and an optical center of the at least camera of the pair of cameras,
a viewing distance ($V_z$) is defined as the distance from the modeled viewer to the modeled viewing screen, and
the second perceptual constraint requires that f times t divided by $d_{min}$ plus e times $V_z$ times ⅓ $W_c$ divided by $W_s$ minus h is less than zero.

16. A computer-implemented method for defining a range of bounding parameter values that satisfy perceptual constraints for a computer-generated scene having a computer-generated object in view of at least one camera of a pair of cameras and a modeled viewer having a maximum outward divergence angle ($\gamma$), the method comprising:
accepting a user selection of a bounding parameter from a set of scene parameters consisting of:
a working distance (d) of the computer-generated scene, wherein the working distance (d) is measured from the pair of cameras to a point in the computer-generated scene,
a focal distance (f) for the pair of cameras,
a sensor width ($W_c$) for the pair of cameras,
a separation distance (t) between the pair of cameras,
the maximum outward divergence angle ($\gamma$) of a modeled viewer,
an inter-ocular distance (e) between a left perspective position and a right perspective position of the modeled viewer,
a screen width ($W_s$) for a modeled screen, and
a viewing distance ($V_z$) from the modeled viewer to the modeled viewing screen;
obtaining a value for scene parameters of the set of scene parameters that were not selected as the bounding parameter;
calculating a first bounding value for the bounding parameter based on a first perceptual constraint and based on the values of the scene parameters of the set of scene parameters that were not selected as the bounding parameter;
calculating a second bounding value for the bounding parameter based on a second perceptual constraint and based the values of the scene parameters of the set of scene parameters that were not selected as the bounding parameter,
wherein the first and second bounding values define a minimum and a maximum value of a range of values for the bounding parameter that satisfy the first and second perceptual constraints; and
storing the first and second bounding values for the bounding parameter.

17. The computer-implemented method of claim 16, further comprising presenting an indicia of one of the minimum and the maximum value of the bounding parameter to the user.

18. The computer-implemented method of claim 17, wherein the presenting an indicia of one of the first and second bounding values to the user includes presenting a warning that one of the minimum and maximum values for the bounding parameter has been exceeded.

19. The computer-implemented method of claim 16, wherein,
a sensor offset parameter (h) is defined for the pair of cameras as the distance between a center of a sensor for the at least one camera of the pair of cameras and an optical center of the at least camera of the pair of cameras,
an effective inter-ocular distance (e') is defined as e plus two times $V_z$ times the tangent of γ, and
the first perceptual constraint requires that f times t divided by $d_{max}$ plus e' time $W_c$ divided by $W_s$ minus h is greater than zero.

20. The computer-implemented method of claim 16, wherein
a sensor offset parameter (h) is defined for the pair of cameras as the distance between a center of a sensor for the at least one camera of the pair of cameras and an optical center of the at least camera of the pair of cameras,
a minimum working distance ($d_{min}$) is defined as the distance from the pair of cameras to a point on the computer-generated object closest to the pair of cameras, and
the second perceptual constraint requires that f times t divided by $d_{min}$ plus e times $V_z$ times ⅓ $W_c$ divided by $W_s$ minus h is less than zero.

21. The computer-implemented method of claim 16, wherein the inter-ocular distance e represents a typical distance between an actual viewer's left and right eye.

22. A non-transitory computer-readable medium including computer-readable instructions that when executed on a computer processor cause the computer processor to define a range of bounding parameter values that satisfy perceptual constraints for a computer-generated scene having a computer-generated object in view of at least one camera of a pair of cameras, the instructions comprising:
accepting a user selection of a bounding parameter from a set of scene parameters comprising:
a working distance (d) of the computer-generated scene, wherein the working distance (d) is measured from the pair of cameras to a point in the computer-generated scene,
a focal distance (f) for the pair of cameras,
a sensor width ($W_c$) for the pair of cameras,
a separation distance (t) between the pair of cameras,
an inter-ocular distance (e) between a left perspective position and a right perspective position of the modeled viewer, and
a screen width ($W_s$) for a modeled screen;
obtaining values for scene parameter of the set of scene parameters that were not selected as the bounding parameter;
calculating a first bounding value for the bounding parameter based on a first perceptual constraint and based on the values of the scene parameters of the set of scene parameters that were not selected as the bounding parameter;
calculating a second bounding value for the bounding parameter based on a second perceptual constraint and based the values of the scene parameters of the set of scene parameters that were not selected as the bounding parameter,
wherein the first and second bounding values define a minimum and a maximum value of a range of values for the bounding parameter that satisfy the first and second perceptual constraints; and
storing the first and second bounding values for the bounding parameter.

23. The non-transitory computer-readable medium of claim 22, further comprising presenting an indicia of one of the minimum and the maximum value of the bounding parameter to the user.

24. The non-transitory computer-readable medium of claim 23, wherein the presenting an indicia of one of the first and second bounding values to the user includes presenting a warning that one of the minimum and maximum values for the bounding parameter has been exceeded.

25. The non-transitory computer-readable medium of claim 22, wherein the first perceptual constraint represents a maximum positive-parallax condition, wherein a maximum parallax distance between a left and right displayed images of the computer-generated object is less than or equal to the inter-ocular distance (e) between a left perspective position and a right perspective position of the modeled viewer.

26. The non-transitory computer-readable medium of claim 22, wherein
a sensor offset parameter (h) is defined for the pair of cameras as the distance between a center of a sensor for the at least one camera of the pair of cameras and an optical center of the at least camera of the pair of cameras,
a maximum working distance ($d_{max}$) is defined as the distance from the pair of cameras to a point on the computer-generated object farthest from the pair of cameras, and
the first perceptual constraint requires that f times t divided by $d_{max}$ plus e times $W_c$ divided by $W_s$ minus h is greater than zero.

27. The non-transitory computer-readable medium of claim 22, wherein the second perceptual constraint represents a maximum negative-parallax condition, wherein a difference between a convergence distance for modeled viewer and a viewing distance ($V_z$) from the modeled viewer to the modeled viewing screen is less than ⅓ diopters.

28. The non-transitory computer-readable medium of claim 22, wherein
a sensor offset parameter (h) is defined for the pair of cameras as the distance between a center of a sensor for the at least one camera of the pair of cameras and an optical center of the at least camera of the pair of cameras,
a viewing distance ($V_z$) is defined as the distance from the modeled viewer to the modeled viewing screen,
a minimum working distance ($d_{min}$) is defined as the distance from the pair of cameras to the point on the computer-generated object closest to the pair of cameras, and
the second perceptual constraint requires that f times t divided by $d_{min}$ plus e times $V_z$ times ⅓ $W_c$ divided by $W_s$ minus h is less than zero.

29. A computer system for defining a range of bounding parameter values that satisfy perceptual constraints for a computer-generated scene having a computer-generated object in view of at least one camera of a pair of cameras, the system comprising:
a memory for storing non-transitory computer-readable instructions;
a processor for executing the computer-readable instructions, the instructions for:
accepting a user selection of a bounding parameter from a set of scene parameters comprising:
a working distance (d) of the computer-generated scene, wherein the working distance (d) is measured from the pair of cameras to a point in the computer-generated scene,
a focal distance (f) for the pair of cameras,
a sensor width ($W_c$) for the pair of cameras,
a separation distance (t) between the pair of cameras,
an inter-ocular distance (e) between a left perspective position and a right perspective position of the modeled viewer, and
a screen width ($W_s$) for a modeled screen;

obtaining values for scene parameters of the set of scene parameters that were not selected as the bounding parameter;

calculating a first bounding value for the bounding parameter based on a first perceptual constraint and based on the values of the scene parameters of the set of scene parameters that were not selected as the bounding parameter;

calculating a second bounding value for the bounding parameter based on a second perceptual constraint and based on the values of the scene parameter of the set of scene parameters that were not selected as the bounding parameter,
wherein the first and second bounding values define a minimum and a maximum value of a range of values for the bounding parameter that satisfy the first and second perceptual constraints; and storing the first and second bounding values for the bounding parameter.

* * * * *

UNITED STATES PATENT AND TRADEMARK OFFICE
CERTIFICATE OF CORRECTION

PATENT NO.          : 8,952,958 B1
APPLICATION NO.     : 13/845701
DATED               : February 10, 2015
INVENTOR(S)         : Matthew Low et al.

Page 1 of 1

It is certified that error appears in the above-identified patent and that said Letters Patent is hereby corrected as shown below:

In the specification

In column 4, line 61, delete "$(S_x, S_{ry})$" and insert -- $(S_{rx}, S_{ry})$ --, therefor.

In column 8, line 42, delete "FIG. 5" and insert -- FIG. 5. --, therefor.

In column 10, line 27, delete "FIG. 5" and insert -- FIG. 5. --, therefor.

In the claims

In column 13, line 30, in claim 11, delete "$(W_x)$" and insert -- $(W_c)$ --, therefor.

In column 15, line 13, in claim 19, delete "time" and insert -- times --, therefor.

Signed and Sealed this
Twentieth Day of October, 2015

Michelle K. Lee
*Director of the United States Patent and Trademark Office*